United States Patent [19]

Berntsson et al.

[11] 3,928,369

[45] Dec. 23, 1975

[54] COMPOUNDS USEFUL AS ANTIDEPRESSIVE AGENTS, AND A PROCESS FOR THEIR PREPARATION

[75] Inventors: Peder Bernhard Berntsson, Vastra Frolunda; Per Arvid Emil Carlsson, Goteborg; Hans Rudolf Corrodi, Askim, all of Sweden

[73] Assignee: Aktiebolaget Hassle, Goteborg, Sweden

[22] Filed: Jan. 7, 1974

[21] Appl. No.: 431,051

Related U.S. Application Data

[63] Continuation of Ser. No. 247,101, April 24, 1972, abandoned.

[30] Foreign Application Priority Data

Apr. 28, 1971 Sweden.............................. 5496/71

[52] U.S. Cl........ 260/296 R; 424/263; 260/570.5 R; 260/570.8 TC
[51] Int. Cl.². ................................... C07D 213/36
[58] Field of Search ............................. 260/296 R

[56] References Cited
UNITED STATES PATENTS
2,712,022  6/1955  Adamson........................ 260/296 R

FOREIGN PATENTS OR APPLICATIONS
689,289   3/1953   United Kingdom.......... 260/296 R
719,276   12/1954  United Kingdom.......... 260/296 R
900,797   7/1962   United Kingdom.......... 260/296 R

*Primary Examiner*—John D. Randolph
*Attorney, Agent, or Firm*—Brumbaugh, Graves, Donohue & Raymond

[57] ABSTRACT

Compounds having the structural formula

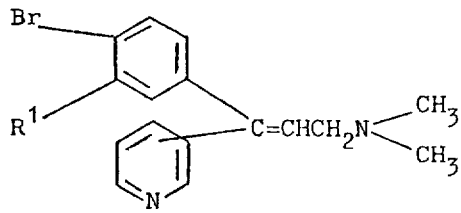

and therapeutically acceptable acid addition salts thereof, where the pyridine nucleus is bound in ortho-, meta- or para-position to the adjacent carbon atom and where $R^1$ is selected from the group consisting of H, and Br, pharmaceutical compositions containing such a compound suitable for use as an antidepressant and methods for preparing such compounds, including the formation of an intermediate compound having a formula

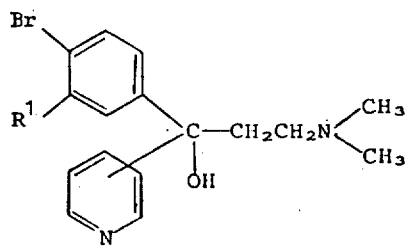

1 Claim, No Drawings

COMPOUNDS USEFUL AS ANTIDEPRESSIVE AGENTS, AND A PROCESS FOR THEIR PREPARATION

The present application is a continuation of application Ser. No. 247,101, filed on Apr. 24, 1972 and now abandoned. The present invention relates to new compounds having therapeutic activity. The invention further comprises pharmaceutical preparations containing at least one of the compounds, the medical use of the compounds and a process for preparing the compounds.

The antidepressive agents having the most widespread, clinical use are the tricyclic tertiary amines imipramine having the structure formula

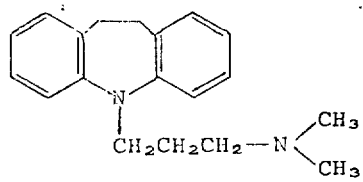

and amitriptyline having the structure formula

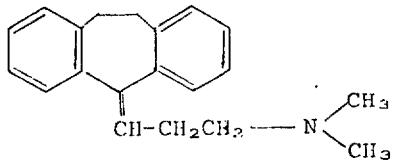

Secondary amines such as desipramine having the structure formula

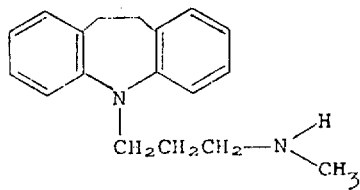

and nortriptyline having the structure formula

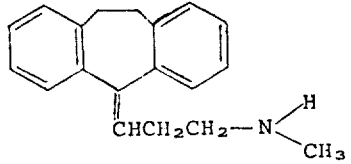

are used to a somewhat less extent. All these substances have, however, side effects which are not desired in therapeutic use such as orthostatism, anticholinergic effects and above all, an arrhythmogenic-heart arrhythmic developing effect when administered in large doses to old patients. The secondary amines, such as desipramine and nortriptyline have also the known effect of developing anxiety in many depressed patients. Moreover, all the substances mentioned show the drawback that the antidepressive effect starts first after some weeks of treatment. This delayed effect must be ascribed to the fact that all the substances have a low antidepressive activity. Further, it is known from the literature that certain 1,1-diphenyl-3-aminoprop-1-enes, such as the compound having the formula

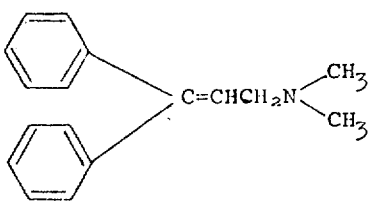

have an antidepressive effect, of J. Med. Chem. 14, 161–4 (1971). From the literature compounds having the formula

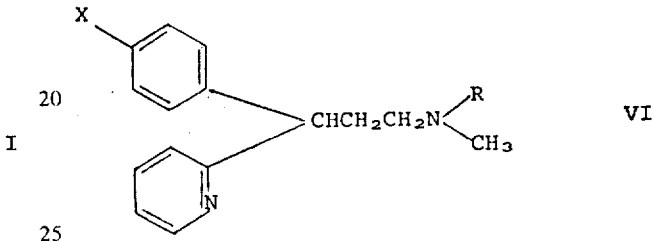

wherein X is chlorine or bromine and R is hydrogen or methyl, are described as having an antihistaminic effect, and antidepressive effect, of U.S. Pat. No. 3,423,510. The compound of formula VI wherein X is bromine and R is methyl is called brompheniramine in Table 1 below. These compounds illustrated by formula V above have, however, the serious side-effect of being anxiety developing and also orthostatism developing.

A main object of the present invention is to obtain new compounds having a good antidepressive effect. A further object of the invention is to obtain compounds having an antidepressive effect which does not produce orthostatism, anticholinergic effects or arrhythmogenic effects. Further objects of the invention will be evident from the following description.

According to the present invention it has been found that compounds of the formula

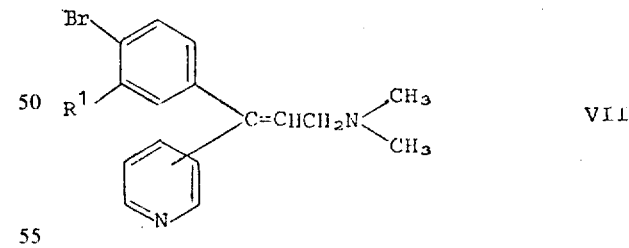

wherein the pyridine nucleus is bound in ortho, meta or para-position to the next carbon atom and wherein the substituent $R^1$ is selected from the group consisting of hydrogen, or bromine, and therapeutically acceptable acid addition salts thereof, are potently active antidepressive, depression reducing agents, which do not give troublesome side effects such as anxiety, orthostatism and heart arrhythmias, as do the clinically most used tricyclic agents such as imipramine, desipramine, amitriptyline and nortriptyline, and the compounds known from the literature, such as those of formula V. Illustrative examples of the compounds of the invention are

| Structure formula | Code number |
|---|---|
| 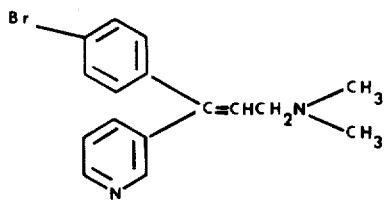 | H 102/09 |
| 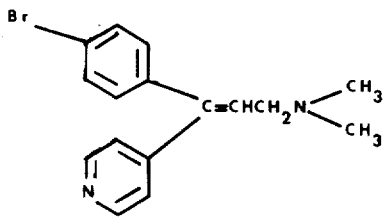 | H 102/10 |
| 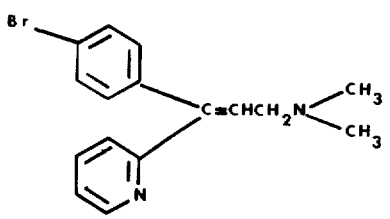 | H 100/04 |
| 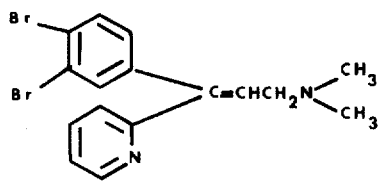 | H 99/88 |
| 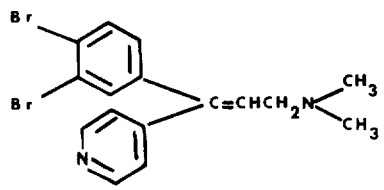 | |
| 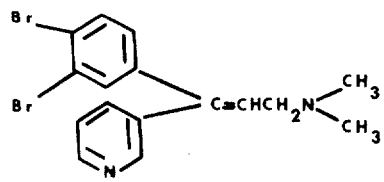 | |

The preferred compounds of the invention are the compounds having code numbers H 102/09, H 102/10 and H 100/04.

The compounds of the invention may be prepared according to processes known per se. a suitable process is the dehydration of a compound of the formula

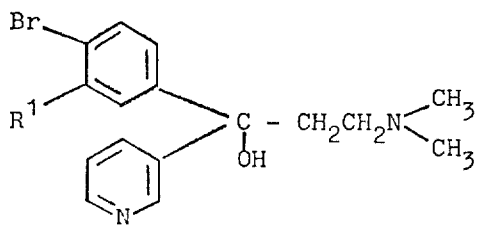  IX to form a compound of the formula

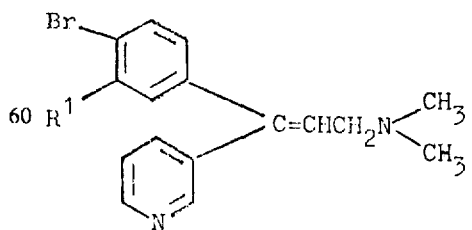  X

The dehydration of the compound of formula IX may for example be done by means of concentrated sulphuric acid and heating of the reaction mixture to a high temperature about 165° to 175°C. The dehydration of the compound of formula IX may also be done by means of other types of acid-catalysis, such as for example by means of hydrochloric acid, HCl, phosphoric acid, $H_3PO_4$, Potassium hydrogen sulphate, $KHSO_4$, or oxalic acid $(COOH)_2$. Other methods of the dehydration of the compound of formula IX to form a compound of the formula X are dehydration using phosphoroxichloride $POCl_3$ in pyridine, and dehydration with thionyl chloride, $SOCl_2$, in pyridine. Also a catalytic dehydration of the compound of the formula IX may be used. The dehydration is in this case carried out at a temperature of about 300° to 500°C using a catalyst such as kaolin, aluminium or aluminium oxide, $Al_2O_3$, as a catalyst.

Starting materials of the formula IX may be prepared in a number of ways, such as by reacting a compound of the formula

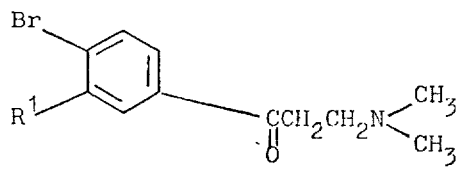 XI with a pyridyllithium compound of the formula

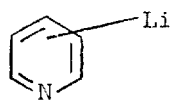 XII in which formulas $R^1$ has the meanings indicated above and the lithium atom is bound in ortho-, meta- or para-position to the pyridine nucleus.

The intermediates of formula IX, where $R^1$ has the meaning given above and where the pyridine nucleus is bound in ortho-, meta- or para-position to the adjacent carbon atom, and thereapeutically acceptable acid addition salts thereof, are a further embodiment of the present invention.

The final compounds according to the invention may exist in cis- or trans-configuration or E- and Z-configuration according to the IUPAC-nomenclature and the therapeutic effect cannot significantly be attributed excluxively to one of these forms but can to a greater or less extent be attributed to one or both of the cis- form and the trans form.

In clinical practice the compounds of the present invention will normally be administered orally, rectally or by injection, in the form of pharmaceutical preparations comprising the active ingredient either as a free base or as a pharmaceutically acceptable acid addition salt, e.g., the hydrochloride, lactate, acetate, oxalate, and the like, in association with a pharmaceutically acceptable carrier which may be a solid, semi-solid or liquid diluent or an edible capsule.

Usually the active substance will constitute between 0.1 and 9.5% by weight of the preparation, more specifically between 0.5 and 20% by weight for preparations intended for injection and between 0.1 an 50% by weight for preparations suitable for oral administration.

To produce pharmaceutical preparations in the form of dosage units for oral application containing a compound of the invention in the form of the free base, or a pharmaceutically acceptable salt thereof, the active ingredient may be mixed with a solid, pulverized carrier, for example, lactose, saccharose, sorbitol, mannitol, a starch such as potato starch, corn starch, maize starch or amylopectin, a cellulose derivative or gelatin, and also may include lubricants such as magnesium or calcium stearate or a Carbowax or other polyethylene glycol waxes and compressed to form tablets or centers for dragees. If dragees are required, the centers may be coated, for example, with concentrated sugar solutions which may contain gum arabic, talc and/or titanium dioxide, or alternatively with a lacquer dissolved in easily volatile organic solvents or mixtures of organic solvents. Dyestuffs can be added to these coatings. For the preparation of soft gelatin capsules (pearl-shaped closed capsules) consisting of gelatin and, for example, glycerol, or similar closed capsules, the active substance may be admixed with a Carbowax. Hard gelatin capsules may contain granulates of the active substance with solid, pulverized carriers such as lactose, saccharose, sorbitol, mannitol, starches, for example, potato starch, corn starch or amylopectin, cellulose derivatives or gelatin, and may also include magnesium stearate or stearic acid. Dosage units for rectal application may be in the form of supppositories comprising the active substance in admixture with a neutral fatty base, or gelatin rectal capsules comprising the active substance in admixture with a Carbowax or other polyethylene glycol waxes.

Liquid preparations for oral application may be in the form of syrups, suspensions or emulsions, for example, containing from about 0.1% to 20% by weight of active substance, sugar and a mixture of ethanol, water, glycerine, propylene glycol and any flavouring agent, saccharine and/or carboxy methyl cellulose as a dispersing agent.

For parenteral application by injection the preparations may contain an aqueous solution of a water-soluble pharmaceutically acceptable salt of the active substance preferably in a concentration of 0.5 to 10% optionally a stabilizing agent and/or buffer substance in an aqueous solution. Dosage units of the solution may advantageously be enclosed in ampoules.

Suitable daily doses of the compounds of the invention for therapeutic treatment are 5 to 500 mg for peroral administration, preferably 50 to 250 mg, and 1 to 100 for parenteral administration, preferably 10 to 50 mg.

Biological effect

It is impossible to produce depression in test animals by experimental procedures. In order to test the antidepressive effect of new substances, biochemical-pharmacological test methods have to be carried out. Such a test method which seems to give such indication of the antidepressive effect of a compound, which effect corresponds quite well with the clinically observed effect, has been worked out and is described in European Journal of Pharmacology, 5, 367–373, (1969) and European Journal of Pharmacology, 5, 357–366, (1969). This test method measures the ability of a compound to block the depletion of noradrenaline in the brain and heart which is induced by an injection of 4,α-dimethyl-m-tyramine, and the ability of the compound to block the depletion of 5-hydroxy-tryptamine in the brain, which is induced by an injection of 4- methyl-α-ethyl-m-tyramine. Especially secondary amines of the type desipramine and nortriptyline are substances which block the depletion of noradrenaline in the brain and heart, but they have the serious side-effect of producing anxiety. The blocking of the depletion of noradrenaline in the brain and heart which is caused by these compounds probably also induces the ortho-statism. Actually, the depression-alleviating effect of a substance seems to be related to the block of the depletion of 5-hydroxytryptamine by 4-methyl-α-ethyl-m-tyramine.

As shown below it has surprisingly been found that the compounds of the invention have a strongly blocking effect on the depletion of 5-hydroxy-tryptamine, which is induced by 4-methyl-α-ethyl-m-tyramine, while the ability of the compounds to block the depletion of noradrenaline, which is induced by 4-α-dimethyl-m-tyramine is lacking completely or is very weak. Further, the compounds of the invention differ from all tricyclic antidepressive agents hitherto used in that they have a much lower heart arrhythmia inducing effect that the tricyclic agents hitherto used. Compounds of the type described in Journal of Medicinal Chemistry 14, 161–164, (1971) have certainly an antidepressive effect, but this antidepressive effect is low compared to the effect of the compounds of the invention, and these known compounds, which are illustrated by compound V above are also sustantially able to block the depletion of noradrenaline in the brain and heart induced by 4-α-dimethyl-m-tyramine, which in man leads to said un-wanted side-effects, anxiety and probably also leads to orthostatism. The compounds described in the U.S. Pat. No. 3,423,510 and illustrated by compound VI above, are described in antihistaminic and antidepressive agents.

A pharmacologic comparison between the compounds of the invention and previously used trycyclic antidepressive agents and compounds described in the literature is given below.
1. Blocking effect on the depletion of 5-hydroxytryptamine induced by 4-methyl-α-ethyl-m-tyramine 1.1 Rats The substance to be tested is injected intraperitoneally in rat. 30 minutes later 50 mg/kg of 4-methyl-α-ethyl-m-tyramine is injected intraperitoneally. Two hours later the animal is killed and the amount of 5-hydroxy-tryptamine in the brain is determined. Animals which are treated with the test substance only, with 4-methyl-α-ethyl-m-tyramine only, respectively, and untreated animals serve as controls. The percental inhibition of the depletion of 5-hydroxytryptamine is determined according to the following formula.

$$\% \text{ inhibition} = \frac{A - B}{C - B} \cdot 100$$

A = the amount of 5-hydroxy-tryptamine (ng/g) in the brain after the administration of the test substance and 4-methyl-α-ethyl-m-tyramine.
B = the amount of 5-hydroxy-tryptamine (ng*/g) in the brain after the administration of 4-methyl-α-ethyl-m-tyramine.

nanograms (10⁻⁹ grams)

C = the amount of 5-hydroxy-tryptamine (ng/g) in the brain after the administration of the test substance.

The effective dose which inhibits the depletion of 5-hydroxy-tryptamine to 50% (ED₅₀) is the calculated by a regression analysis. The test results are given in Table 1 below.

1.2 Mice

The substance to be tested is injected intraperitoneally in mice. 30 minutes later 100 mg/kg of 4-methyl-α-ethyl-m-tyramine is injected intraperitoneally. 90 minutes later the test substance is administered again in an amount corresponding to half the original dose and 30 minutes later 4-methyl-α-ethyl-m-tyramine (100 mg/kg) is administered. 2 hours later the animals are killed and the amount of 5-hydroxytryptamine in the brain is determined.

The percental inhibition of the depletion of 5-hydroxy-tryptamine and the ED₅₀ is determined in the same way as under 1.1. A detailed description of the method is given in European Journal of Pharmacology 5, 357–366, (1969). The test result is given in Table 1 below.

2. The blocking effect of the depletion of noradrenaline induced by 4,α-dimethyl-m-tyramine The substance to be tested is injected intraperitoneally in mice (10 mg/kg). 30 minutes later 4,α-dimethyl-m-tyramine is administered (12.5 mg/kg). 90 minutes later half the original dose of test substance (5 mg/kg) is administered to the animals and 30 minutes later 4,α-dimethyl-m-tyramine (12.5 mg/kg) is administered. 2 hours later the animals are killed and the amount of noradrenaline in the brain and the heart is determined. Animals treated with the test substance only and with 4,α-dimethyl-m-tyramine only respectively and untreated animals are used as controls.

The percental inhibition of the depletion of noradrenaline is determined according to the following formula.

$$\% \text{ inhibition} = \frac{A - B}{C - B} \cdot 100$$

A = the amount of noradrenaline (ng/g) in the brain and heart, respectively, after administration of test substance and 4,α-dimethyl-m-tyramine.
B = the amount of noradrenaline (ng/g) in the brain and heart, respectively, after the administration of 4,α-dimethyl-m-tyramine.
C = The amount of noradrenaline (ng/g) in the brain and heart, respectively, after the administration of the test substance. The test result is given in Table 1 below.

3. The heart arrhythmia inducing effect

A solution of the test substance is constantly and slowly infused into nembutal anesthetized rats and the electrocardiograms of the animals are observed. After a certain time an irregular heart rhythm occurs, which becomes more serious and finally leads to a ventricular fibrillation, whereby the animals die. The accumulated dose which is necessary to induce ventricular fibrillation is given in Table 1 below.

Table 1

Blocking effect on the depletion of 5-hydroxy-tryptamine induces by 4-methyl-α-ethyl-m-tyramine. Blocking effect on the depletion of noradrenaline induced by 4,α-dimethyl-m-tyramine and arrhythmia inducing effect.

| Compound Tested | Blockage of the depletion of 5-hydroxy-tryptamine induced by 4-methyl-α-ethyl-m-tyramine $ED_{50}$ mg/kg | | Blockage of the depletion of noradrenaline in mice induced by 4,α-dimethyl-m-tyramine. Percentage inhibition after injection of 10 mg/kg bodyweight of test substance i.p. | | Dose (mg/kg bodyweight i.p.) which induces ventricular fibrillation at constant infusion |
|---|---|---|---|---|---|
| | mice | rats | brain | heart | |
| imipramine | 25 | not tested | 11 | 14 | 9 |
| amitriptyline | 14 | not tested | 11 | 45 | 10 |
| chloroimipramine | 7.5 | 10 | 0 | 30 | 11 |
| brompheniramine | 7.2 | 14 | 21 | 61 | 40 |
| 1-p-bromophenyl-'-phenyl-3-dimethylamino-propene (-1) | 15 | 20 | 19 | 52 | 20 |
| 1.1-diphenyl-3-dimethylamino-propene (-1) | 20 | 25 | 15 | 41 | 20 |
| 1-p-chlorophenyl-1-phenyl-3-methylamino-propane | >>25 | >>25 | 50 | 70 | 34 |
| H 100/04 | 4 | 10 | 6 | 26 | 74 |
| H 102/09 | 3.5 | 5 | 6 | 9 | 64 |
| H 102/10 | 5 | 9 | 17 | 24 | not tested |
| H 99/88 | 4 | 5 | 8 | 15 | not tested |

As evident from the test values of Table 1 the compounds tested of the invention have a strong blocking effect on the depletion of 5-hydroxy-tryptamine induced by 4-methyl-α-ethyl-m-tyramine compared to the reference substances, while the effect of the compounds of the invention on the depletion of noradrenaline induced by 4,α-dimethyl-m-tyramine is low. That does in mg/kg bodyweight i.p., which induces ventricular fibrillation at a constant infusion is in the same way considerably higher for the compounds tested of the invention compared to the reference substances, which means that the compounds of the invention have a considerably lower heart arrhythmia inducing effect than the reference substances.

The preparation of the compounds of the present invention is illustrated by the following Examples.

EXAMPLE 1

The preparation of (E)— and (Z)—3—(4'-bromophenyl-3-(2''-pyridyl)-dimethylallylamine dihydrochloride.

97 g of 1-(4'-bromophenyl)-3-(N,N-dimethylamino)-1-(2'-pyridyl)-propanol (H 94/96) are dissolved in 300 ml of 85% $H_2SO_4$ and heated at 170°C for 10 minutes. Thereafter the reaction mixture is poured into 1 l. of water, which is made alkaline by means of 10 N NaOH and is extracted with 2 × 250 ml of ether, which is dried, treated with active carbon and evaporated. The product obtained is dissolved in 250 ml of ether and dry HCl is introduced. The precipitate obtained is filtered off and recrystallized from ethanol (99.5%). Yield 40 g of (Z)-3-(4'-bromophenyl)-3-(2''-pyridyl)-dimethylallylamine dihydrochloride (H 100/04) Mp 195°C.

The mother liquor from the recrystallization is evaporated, and the residue is dissolved in acetone. After 24 hours the precipitate formed is filtered off. Yield 15 g (E)-3-(4'-bromophenyl)-3-( 2''-pyridyl)-dimethylallylamine dihydrochloride (H 100/03) Mp 160°C.

The starting material 1-(4'-bromophenyl)-3-(N,N-dimethylamino)-1-(2''-pyridyl)-propanol was prepared in the following way:

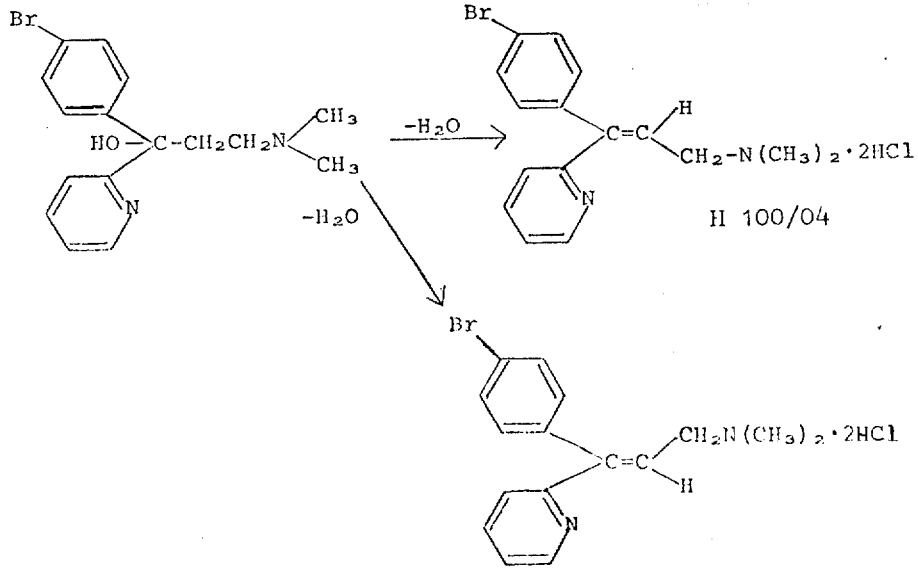

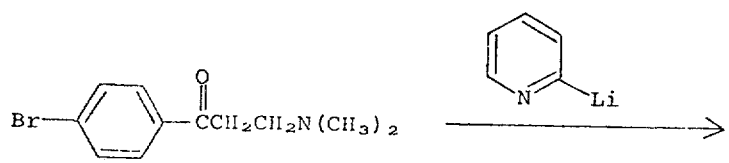

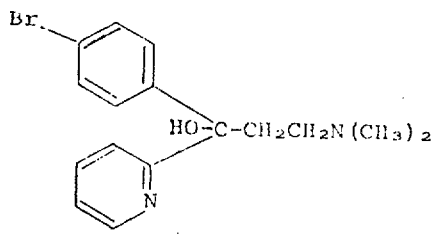

To 50 g of n-butyl lithium in 0.5 l of dry ether, 23.7 g of 2-bromopyridine is added at −40°C as quickly as possible without raising the temperature. After finishing the addition the mixture is stirred for another 30 minutes. Than 1.5 l of dry ether is added and then 197 g ω-dimethylamino-4'-bromopropiophenone is added so that the temperature does not exceed −40'C. The cooling is discontinued and the mixture is stirred during the night, whereupon the reaction mixture is poured onto ice and diluted HCl, and is then washed with some methylene dichloride. Thereafter the aqueous phase is made alkaline and is extracted with ether, which is dried and evaporated. The residue is recrystallized from petroleum ether at 40°–60°C. Yield 98 g of 1-(4'-bromophenyl)-3-(N,N-dimethylamino)-1-(2''-pyridyl)-propoanol. Mp. 85°C.

EXAMPLE 2

The preparation of 3-(4'-bromophenyl)-3-(3''-pyridyl)-dimethylallylamine dihydrochloride.

3.6 g of 1-(4'-bromophenyl)-3-(N,N-dimethylamino)-1-(3''-pyridyl)-propanol are dissolved in 15 ml of 85% H₂SO₄ and heated at 170°C for 10 minutes. The reaction mixture is poured 60 ml of water, which then is made alkaline with 10 N NaOH, and is extracted with 2 × 25 ml of ether. The ether is dried with Na₂SO₄, treated with active carbon and evaporated. The residue is dissolved in 25 ml of acetone and an equivalent amount of oxalic acid dissolved in 25 ml of acetone is added. The precipitate obtained is filtered off, is dissolved in 50 ml of water, which is made alkaline with 10 N NaOH and is extracted with 2 × 25 ml of ether. The ether solution is dried with Na₂SO₄ and is filtered, whereupon dry HCl is introduced. The precipitate obtained is filtered off. Yield 1.2 g of 3-(4'-bromophenyl)-3-(3''-pyridyl)-dimethylallylamine dihydrochloride (H 102/09). Mp 193°C.

The starting material, 1-(4'-bromophenyl)-3-(N,N-dimethylamino)-1-(3''-pyridyl)-propanol is prepared in the following way.

To 9 g of n-butyllithium in 200 ml of dry ether 20 g of 3-bromopyridine is added as quickly as possible at −40°C without raising the temperature. When the addition is finished the mixture is stirred for another 30 minutes. Thereafter 32.5 g of ω-dimethylamino-4'-bromopropiophenone is added in such a way that the temperature does not exceed −40°C. The cooling is discontinued and the mixture is stireed during the night whereupon the reaction mixture is poured onto ice and diluted HCl, which is washed with ether and is extracted with 20 ml of methylene dichloride. The methylene dichloride is dried and evaporated. The crystals are dissolved in water, which then is made alkaline with a solution of Na₂CO₃, is extracted with ether, dried, and evaporated and recrystallized from isopropyl ether, petroleum ether 1:1. Yield 4 g of 1-(4'-bromophenyl)-3-(N,N-dimethylamino)-1-(3''-pyridyl)-propanol. Mp. 67°C.

EXAMPLE 3

The preparation of 3-(4'-bromophenyl)-3-(4''-pyridyl)-dimethylallylamine dihydrochloride 3 g of 1-(4'-bromophenyl)-3-(N,N-dimethylamino)-1-(4''-pyridyl)-propanol are dissolved in 10 ml of 85% H₂SO₄ and is heated at 170°C for 15 min. The reaction mixture is then poured into ice water, which is made alkaline with 10 N NaOH and is extracted with ether. The ether phase is dried and dry HCl is introduced. The precipitate obtained is filtered off and is recrystallized by dissolving it in ethanol and then precipitating it by adding acetone. Yield 1.4 g of 3-(4'-bromophenyl)-3-(4''-pyridyl)-dimethylallylamine dihydrochloride. Mp 190°C (H 102/10).

The starting material, 1-(4'-bromophenyl)-3-(N,N-dimethylamino)-1-(4''-pyridyl)-propanol is prepared in the following way.

To 10 g of n-butyllithium in 250 ml of dry ether 17.7 g of 4-bromopyridine is added at −40°C as quickly as possible without raising the temperature, whereupon the mixture is stirred for another 30 minutes. 28.7 g of ω-dimethylamino-4'-bromopropiophenone is added in such a way that the temperature does not exceed −40°C. The cooling is discontinued and the mixture is stirred during the night whereupon the reaction mixture is poured onto ice and diluted HCl. The aqueous phase is washed with methylene dichloride whereupon it is made alkaline with 10 N NaOH and is extracted with ether. The ether phase is dried with Na₂SO₄, purified with activated carbon and evaporated. The residue is recrystallized from diisopropylether. Yield 3 g of 1-(4'-bromophenyl)-3-(N,N-dimethylamino)-1-(4''-pyridyl)-propanol. Mp 120°C.

The following compounds were prepared in a manner analogously with the process of Examples 1 to 3.

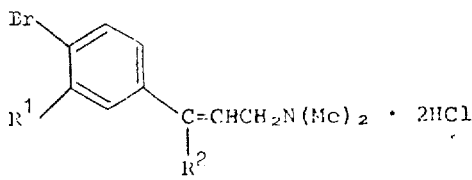

| Example Compound (code number) | R² | R¹ | Melting point °C |
|---|---|---|---|
| 1 H 100/04 | '' | H | 195 |
| 1 H 100/03 | '' | H | 160 |
| 4 H 99/88 | '' | Br | 136 |
| 2 H 102/09 | '' | H | 193 |
| 3 H 102/10 | '' | H | 190 |

Following examples illustrate how the compound of the present invention may be included into pharmaceutical preparations.

EXAMPLE 5

Preparation of soft gelatin capsules.

500 g of active substance were mixed with 500 g of corn oil, whereupon the mixture was filled in soft gelatin capsules, each capsule containing 100 mg of the mixture (i.e., 50 mg of active substance).

EXAMPLE 6

Preparation of soft gelatin capsules.

500 g of active substance were mixed with 700 g of peanut oil, wherein the mixture was filled in soft gelatin capsules, each capsule containing 125 mg of the mixture (i.e. 50 mg of active substance).

EXAMPLE 7

Preparation of tablets.

50 kg of active substance were mixed with 20 kg of silicic acid of the trademark Aerosil. 45 kg of potato starch and 50 kg of lactose were mixed therewith and the mixture was moistened with a starch paste prepared from 5 kg of potato starch and distilled water, whereupon the mixture was granulated through a sieve. The granulate was dried and sieved, whereupon 2 kg of magnesium stearate was mixed into it. Finally the mixture was pressed into tablets each weighing 172 mg.

EXAMPLE 8

Preparation of an emulsion.

100 g of active substance were dissolved in 2500 g of peanut oil. From the solution thus obtained, 90 g of gum arabic, aroma and colouring agents (q.s.) and 2500 g of water an emulsion was prepared.

EXAMPLE 9

Preparation of a syrup.

100 g of active substance were dissolved in 300 g of 95 % ethanol, whereupon 300 g of glycerol, aroma and colouring agents (q.s.) and 1000 ml of water were mixed therein. A syrup was obtained.

EXAMPLE 10

Preparation of a solution.

100 g of active substance were dissolved in 2000 g of polyoxyethylene sorbitan monooleate, whereupon flavouring agents and colouring agents (q.s.) and water to 5000 ml were mixed therein. A drop solution was obtained.

EXAMPLE 11

Preparation of effervescing tablets.

100 g of active substance, 140 g of finely divided citric acid, 100 g of finely divided sodium hydrogen carbonate, 3.5 g of magnesium stearate and flavouring agents (q.s) were mixed and the mixture was pressed into tablets each containing 100 mg of active substance.

EXAMPLE 12

Preparation of a drop solution.

100 g of active substance were mixed with 300 g of ethanol, whereupon 300 g of glycerol, water to 1000 ml, aroma and flavouring agents (q.s) and 0.1 N sodium hydroxide solution (to pH 4.5 to 5.5) were added while stirring. A drop solution was obtained.

EXAMPLE 13

Preparation of a sustained release tablet.

200 g of active substance were melted together with 500 g of stearic acid and 50 g of carnauba wax. The mixture thus obtained was cooled and ground to a particle size of at most 1 mm in diameter. The mixture thus obtained was mixed with 5 g of magnesium stearate and pressed into tablets each weighing 305 mg. Each tablet thus contains 200 mg of active substance.

We claim:
1. A compound having the structural formula

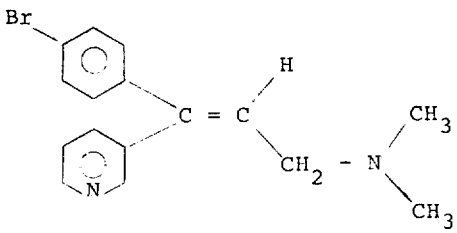

or a pharmaceutically acceptable acid addition salt thereof.

* * * * *